2 Sheets—Sheet 1.

T. J. BROUGH.

HYDROCARBON BURNER.

No. 11,657. Reissued Mar. 22, 1898.

Witnesses.

G. A. Pauberschmitt,

J. H. Griffiths.

Inventor.

Thomas J. Brough

By Edwin S. Clarkson his attorney

2 Sheets—Sheet 2.

T. J. BROUGH.

HYDROCARBON BURNER.

No. 11,657. Reissued Mar. 22, 1898.

Witnesses.

G. A. Pauberschmidt.

J. S. Griffiths.

Inventor.

Thomas J. Brough

By Edwin S. Clarkson his attorney

UNITED STATES PATENT OFFICE.

THOMAS J. BROUGH, OF BALTIMORE, MARYLAND.

HYDROCARBON-BURNER.

SPECIFICATION forming part of Reissued Letters Patent No. 11,657, dated March 22, 1898.

Original No. 559,670, dated May 5, 1896. Application for reissue filed January 7, 1898. Serial No. 665,993.

*To all whom it may concern:*

Be it known that I, THOMAS J. BROUGH, of the city of Baltimore, State of Maryland, have invented a new and useful Improvement in Hydrocarbon-Burners, of which the following is a specification.

The object of my invention is to provide a hydrocarbon-burner for burning coal-oil or crude oil, either for heating or illuminating purposes, without the use of a wick, and which when used for heating purposes produces a blue blaze of the greatest heating capacity without smoking or depositing its carbon; further, to provide means whereby the outlet-orifice may be thoroughly cleaned and at all times be of the same diameter.

To this end it consists in the peculiar construction and arrangements of the parts of the burner, which I will now proceed to describe.

Figure 1:
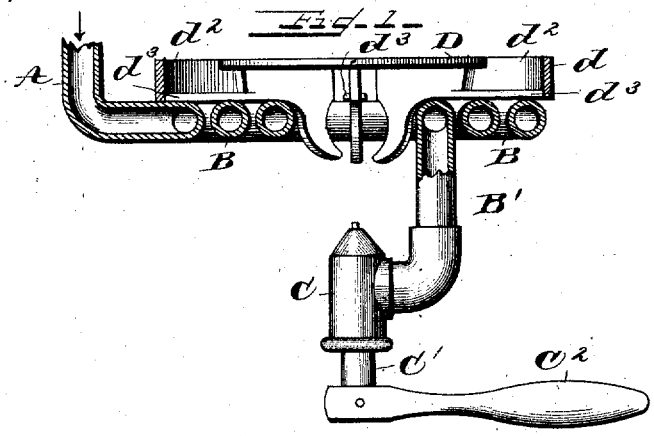
Figure 2:
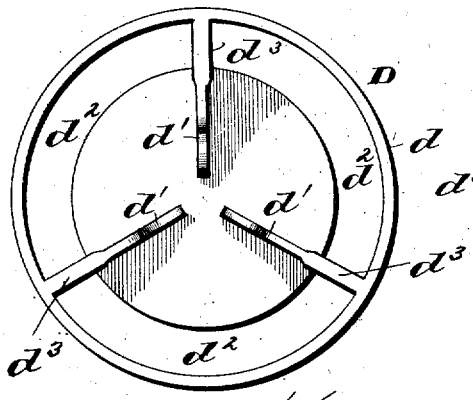
Figure 3:
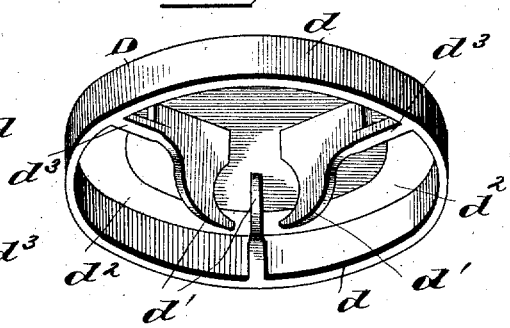
Figure 4:
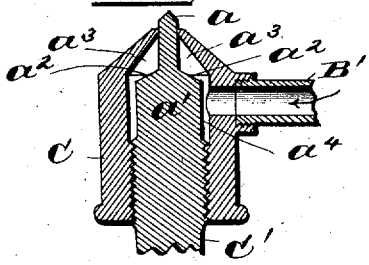
Figure 5:
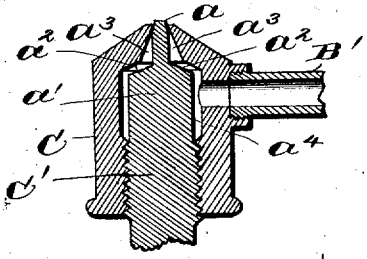
Figure 6:
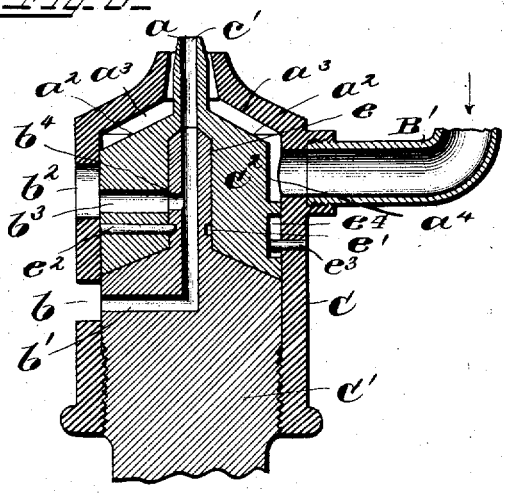
Figure 7:
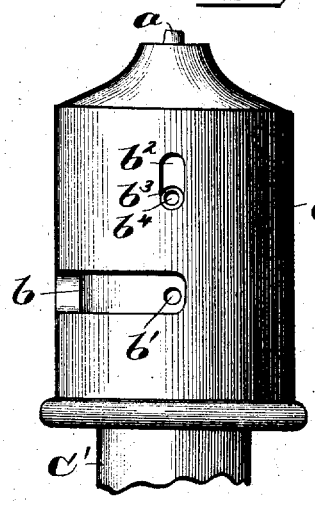
Figure 8:
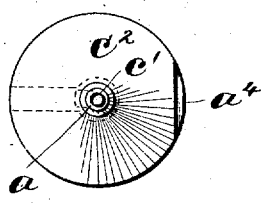

Figure 1 is a side view, partly in section, of my improved burner. Fig. 2 is an underneath or inverted plan view of the deflector for the burner. Fig. 3 is a perspective view of the same. Fig. 4 is a vertical section of the burner-valve. Fig. 5 is a similar view showing a slight modification. Fig. 6 is a section, and Fig. 7 is a side view, of the burner-valve as constructed for mingling air with the oil-vapors. Fig. 8 is a plan view of the slide-valve or cap, and Figs. 9 and 10 are respectively a sectional view and a plan view of a still further modification of burner-valve.

Referring to Figs. to 1, 2, and 3, A is the oil-pipe, leading from the reservoir and terminating in a horizontal volute spiral coil B. D is a detachable deflector-plate for spreading the flame about the coil B and retaining the heat thereabout. This deflector consists of a central disk portion having three (more or less) radial tongues $d'$, that project downwardly through the central opening in the coil B and serve to hold the deflector in place. Said deflector also has an external ring or flange $d$, connected at $d^3$ to the central disk, and between which flange and the central disk are left segmental openings $d^2$, through which the hot products of combustion may pass. The inner end of coil B extends downwardly at B′ and connects with the case C of the burner-valve. This case (see Figs. 4 and 5) is screw-threaded interiorly at its lower end to receive a screw-threaded plug C′, which is turned by a handle $C^2$ to advance or withdraw the stem in the case. The case C is enlarged or the stem C′ slightly reduced at its upper end $a'$ to allow the oil from pipe B′ to pass around it, and the upper end of the case is formed with a conical seat $a^3$, terminating with an outlet. The upper end of the valve-stem has a pin $a$, the straight part of which is the exact diameter necessary for the full size of the vapor-outlet. This pin protrudes through the outlet in the case and has a shoulder $a^2$, which when the valve is shut bears against and tightly fits with a ground joint against the conical surface of the seat $a^3$. This seat $a^3$ may have a single straight taper, as in Fig. 4, or it may have two different tapers at an angle, as in Fig. 5. In either case the pin $a$ passes through the outlet in the case, guides the valve-stem, and the straight part $a$ sizes and cleans the vapor-outlet, while the shoulder $a^2$ tightly closes and shuts off the escape of vapor or oil by coming to a tight bearing against the conical seat $a^3$.

In Figs. 6, 7, and 8 I show a burner-valve for mingling air with the gas. The valve-stem C′ has a slide-valve cap or section $C^2$ concentrically arranged on top of its stem $e$ and connected to it for a swiveling action by a circular groove $e'$ in stem $e$ and a pin $e^2$ in the slide-valve cap $C^2$, so that when C′ and $e$ are turned $C^2$ moves up or down without turning, being prevented from rotating in the case by a groove $e^4$, receiving a pin $e^3$ in the case. The stem $e$ of the rotary plug and also the stem $a$ of the slide-valve or cap $C^2$ are provided with alined longitudinal openings $c'$ and $b'$, which admit air centrally to the flame and take it through the side of the case at two points, one through openings $b^3$ in the slide-valve section and $b^4$ in stem $e$, which register with a larger opening $b^2$ in the side of the case, this latter opening being long enough not to cut off the air as the slide-valve moves up or down. The other opening $b'$ receives its air through a slot $b$, extending about one-fourth around the case, so that it continues to receive air as the screw-plug rotates in its adjustment. To pass the oil from pipe B′ to the outlet-opening in the case, the slide-valve section $C^2$ is cut away on one side, as at $a^4$ in Fig. 8.

Figure 9:
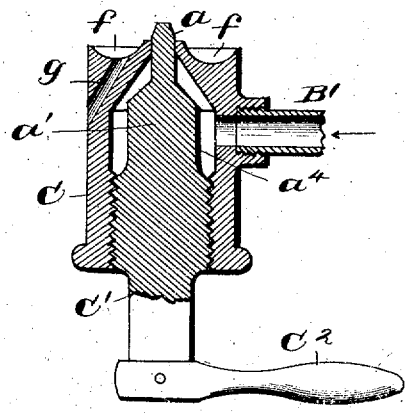
Figure 10:
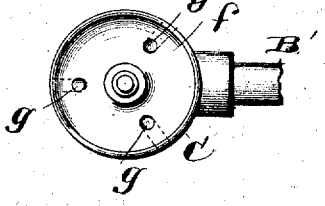

As a further modification I may make the case with a cup-shaped upper end, as at $f$ in Figs. 9 and 10, and form three (more or less) air-ducts $g$ through the edge of the case, entering obliquely the cup-shaped receptacle and throwing air into the flame.

I am aware that various forms of burner-caps for hydrocarbon-burners have been made; but I do not know that any such cap or deflector as mine has ever been constructed, which is designed for special combination with a spiral coil of pipe, and in which a marginal vertical flange $d$ at the outer edge is connected to a smaller central disk D by radial arms $d^3$, so as to leave segmental spaces $d^2$ between, and the radial arms $d^3$ are extended down in the center to form tongues $d'$, that pass through the central opening in the coil and hold the cap or deflector against lateral displacement, so that the hottest products of combustion pass up centrally to the disk D and are then deflected outwardly to the segmental openings $d^2$, serving in such passage to heat the oil in the coils, which then are effectually heated to volatilize the oil and yet afford no obstruction to the draft. The burner-cap or deflector, as composed of the disk D, marginal flange $d$, radial arms $d^3$, and downwardly-extending tongue $d'$, immediately below the disk D, is all cast in one piece, and, as before suggested, is correlated to the coil in special combination. I am also aware that valves have heretofore been constructed in which a screw-plug has a reduced stem playing in the outlet-orifice and a shoulder behind the stem that had sides parallel to the case and was adapted to come to a flat bearing against the case. In my invention the shoulder has its sides out of parallel with the sides of the case and does not come to a flat bearing; but the shoulder on the screw-plug is cut so as to cause its sharp edge only to bear against the conical seat of the case. This not only centralizes the screw-plug and its regulating-stem, but makes an absolutely tight fit that precludes the leaking of vapor or oil past it. I am also aware of the various forms of stems and needles in use in other vapor-generators, none of which to my knowledge perform the function of mine in maintaining a uniform size for the gas or vapor outlet against deposit of carbon, accumulation of dirt, &c.

What I claim, and desire to secure by Letters Patent, is—

1. In a hydrocarbon-burner, the combination with the burner outlet-orifice, a valve, a cylindrical sizing and cleaning stem carried by the valve and adapted to extend through said orifice and to size and clean the same, said stem having a diameter equal to that of the orifice.

2. In a hydrocarbon-burner, the combination with a valve-casing having a burner outlet-orifice, a valve-seat, a valve plug and stem in said casing, of a cylindrical sizing and cleaning stem, integral with and extending beyond the valve, of a diameter equal to that of the orifice referred to and adapted to pass through, size and clean said orifice for the purpose specified.

3. In a hydrocarbon-burner, the combination with a horizontal spiral coil having a central opening and its end carried down and terminating in a subjacent burner-valve, of a burner-cap or deflector consisting of a central disk, a vertical marginal flange of larger diameter, radial arms connecting it permanently to the central disk and having tongues extended downwardly below the central disk and fitting through the opening of the coil, whereby the coils are heated without interfering with the upward draft, and the cap is securely but removably held upon the coils substantially as and for the purpose described.

4. The air-mixing oil-burner consisting of the screw-threaded case with openings $b$ and $b^2$ in its side, and a conical seat and outlet at its upper end; the screw-plug C′ with channeled stem $e$ having peripheral groove $e'$, the slide-valve or cap-section $C^2$ concentrically mounted on stem $e$ and provided with longitudinally-channeled stem $a$, lateral openings $b^3$, pin $e^2$, and means for preventing it from rotating, substantially as and for the purpose described.

5. The air-mixing oil-burner, consisting of the screw-threaded case with longitudinal opening $b^2$ and transverse opening $b$ in its side and a conical seat and outlet at its upper end, the screw-plug C′ with channel $b'$, channeled stem $e$ having peripheral groove $e'$, and opening $b^4$, the slide-valve or cap-section $C^2$ concentrically mounted on stem $e$ and provided with longitudinally-channeled stem $a$, lateral opening $b^3$, pin $e^2$, and a sliding pin connection $e^3$ $e^4$ substantially as and for the purpose specified.

THOMAS J. BROUGH.

Witnesses:
EDWIN S. CLARKSON,
ROBT. L. CAMERON.